United States Patent Office 3,580,887
Patented May 25, 1971

3,580,887
ELASTOMERIC PRODUCTS OF EPOXY RESINS AND POLYETHER DISECONDARY AMINES
Allen J. Hubin, White Bear Lake, Minn., assignor to Minnesota Mining & Manufacturing Company, St. Paul, Minn.
No Drawing. Filed Apr. 21, 1969, Ser. No. 818,114
Int. Cl. C08g 30/14
U.S. Cl. 260—47
8 Claims

ABSTRACT OF THE DISCLOSURE

An elastomeric reaction product of an epoxy resin and at least one amine having a minimum of 2 amino hydrogen atoms per molecule, at least one portion of said amine being a polyether disecondary amine.

This invention relates to high strength, high elongation chain extended elastomers of epoxy compounds and polyether disecondary amines. In one aspect this invention relates to such elastomers in which the polyether disecondary amines are polyoxytetramethylene disecondary amines.

As used herein, elastomer is defined as a substance that can be stretched at room temperature to at least twice its original length and, after having been stretched to 200% of its original length and the stress removed, returns with force to approximately its original length in a short time [ASTM Special Technical Bulletin No. 184 (1956)].

A very useful class of elastomers is that which can be formed by the reaction of at least two materials which are capable of being processed in the liquid phase and which are susceptible to ready compounding and mixing, one material providing "soft" structural segments and the second material providing "hard" structural elements of the ultimate elastomer. In general, "soft" segments are those which comprise relatively long units of recurring structural elements which are characterized by a high degree of rotational freedom about the chemical bonds constituting these units. When present as the predominant component, "soft" segments confer to the elastomer the ability to deform relatively easily upon the application of significant shear, tensile or compressive forces. The "hard" structural elements are rigid units recurring along the ultimate elastomeric polymer chain which confer an appreciable resistance to excessive and irreversible complication of the elastomer to shear forces, such as a viscous liquid would exhibit. "Hard" structural elements are of such a nature that polymers containing predominant proportions of these are very rigid rather than elastomeric. Epoxy resins containing two or more oxirane groups per molecule furnish suitable "hard" structural elements. The diglycidyl ethers of aromatic diols provide particularly useful "hard" structural elements.

Primary amine terminal groups appended to polyethers based predominantly on tetrahydrofuran provide the requisite reactivity with oxirane groups to combine in the ultimate elastomer highly favored species of "soft" segments and "hard" structural elements in desired proportions. Despite the excellent elastomers that can be produced by the reaction of such polyether diprimary amines with polyoxirane compounds, as disclosed in Italian Pat. No. 761,529, issued May 2, 1967 and U.S. Ser. No. 496,-139, filed Oct. 14, 1965 and now U.S. Pat. No. 3,436,359, they have certain serious disadvantages. The polyether diprimary amines are tetrafunctional with respect to their reactivity with oxirane groups, i.e. each of the two primary amine nitrogen end groups is capable of reacting with two oxirane groups. The net effect of the tetrafunctionality of these compounds is a tendency to produce a covalent crosslink at the site of each original primary amine group whenever the reaction is performed with at least an equivalent concentration of a polyoxirane compound. These crosslinks join together primary polyether chains and act as "tie-points" which inhibit the mobility of the "soft" segments within the vulcanizate matrix. The aforementioned patent describes the requirement that the molecular weight of the polyether diprimary amine must be at least 3500 in order to produce a useful elastomer through reaction with an appropriate polyoxirane compound. At lower molecular weight the crosslinking density of the vulcanizate (i.e. the frequency of "tie-point" recurrence) becomes so high that the product loses essentially all utility in elastomer applications. Epoxy elastomers prepared from primary amine terminated polyethers thus suffer the following disadvantages: (1) the desired control of crosslinking density in the ultimate vulcanizate can largely be effected only by the selection of a relatively high molecular weight (i.e. at least 3500) polyether diprimary amine as one of the principal reactants; and (2) the viscosity of polyether diprimary amines in the desired molecular weight range is inherently so high (due to the relatively high molecular weight), that their proper formulation and mixing with epoxy compounds, desired catalysts, fillers, stabilizers, coloring agents, etc. is often very difficult, if not impossible, in the absence of solvent thinners. The latter difficulty is especially true in instances where the requirements of a high degree of toughness in the ultimate elastomer are so rigorous as to impose the choice of a polyether diprimary amine having a molecular weight of 5000 or greater.

It is an object of this invention to provide a new and useful class of chain-extended epoxy elastomers. A further object of this invention is to provide novel elastomers from epoxy resins and polyether amines having a more controllable degree of crosslinking. Another object of this invention is to provide novel epoxy polyether disecondary amine elastomers from polyether polyamines having molecular weights as low as 400. Still another object of this invention is to provide epoxy elastomers which have higher tensile strength and/or elongation values than can generally be obtained from comparable systems based on polyether polyprimary amines. Further objects and advantages will be apparent from the following disclosure.

It has now been found that excellent epoxy elastomers can be obtained as the elastomeric reaction product of an epoxy resin, a major portion of which has an oxirane equivalence of about 2, and at least one amine having a minimum of 2 amino hydrogen atoms per molecule, at least about 3 mole percent of said amine and a major portion of all polyether polyamine being a polyether disecondary amine having (a) a polyether moiety of 400 minimum molecular weight and 50° C. maximum melting point, said moiety consisting essentially of recurring units of which at least a major portion consists of oxytetramethylene recurring units and at most a minor portion consists essentially of another oxyalkylene or thioalkylene recurring units having from 2 to 6 straight chain carbon atoms, said polyether moiety having less than 6 weight percent of tertiary amino nitrogen atoms, and (b) secondary amine terminal groups attached directly to each end of said polyether moiety, the amount of said epoxy resin being sufficient to provide at least one oxirane ring for each amino hydrogen atom. In the preferred embodiments of this invention the polyether disecondary amine is at least about 6 mole percent of the total amine having a minimum of 2 amino hydrogen atoms per molecule. Particularly when relatively high molecular weight polyamines free of recurring ether units are also present, the polyether disecondary amine is normally desired in a minimum of about 25 weight percent of said total amine.

The use of polyether disecondary amine compounds in reaction with dioxirane compounds obviates the difficulties associated with the use of polyether polyprimary amines, as discussed above. Since polyether disecondary amines are difunctional with respect to their oxirane reactivity, the use of these materials permits the preparation of elastomers by "chain extension" (i.e. the process of polymer chain growth by polyaddition reactions) with an epoxy resin having 2 oxirane equivalents per molecule, with or without crosslinking, both the chain extension and crosslinking reactions being susceptible to independent and ready control as will become manifest in later examples and discussion. The achievement of these controls makes possible the realization of the following advantages: (1) polyether disecondary amine compounds of relatively low molecular weight, e.g. as low as about 400, can be used to produce elastomers using reactant systems having excellent fluidity; (2) it is possible to select reactant systems (e.g. those containing a high ratio of secondary/primary amine groups and/or a high ratio of dioxirane/polyoxirane compounds) that favor extremely high ratios of chain extension/crosslinking reactions, thereby promoting the formation of very strong, highly extensible elastomers; and (3) latitude is also afforded in the selection of reactant systems which favor higher ratios of crosslinking/chain extension reactions (e.g. by the use of reactant systems having higher ratios of primary/secondary amine groups and/or higher ratios of polyoxirane/dioxirane compounds). As used herein "polyoxirane" denotes those compositions with more than 2 oxirane equivalents per molecule. The attainment of a higher crosslinking density in the latter instance may be desired in certain instances to reduce the stress decay or solvent sensitivity properties of the ultimate elastomer. However, it should be emphasized that a penalty in ultimate strength and elongation properties is almost always exacted in cases where higher crosslinking densities are realized.

The particular epoxy resin used as the dioxirane compound is not critical. However, inasmuch as the epoxy resin generates the hard segments, epoxy resins are preferred which introduce rigid molecular structures in the chain-extended product, for example such epoxy resins as resorcinol diglycidyl ether. Especially preferred are the normally liquid epoxy resins, such as the diglycidyl ethers based on epichlorohydrin and bisphenol A (i.e. 2,2-bis-4-hydroxyphenyl propane).

The polyether disecondary amines used in preparing the epoxy elastomers of this invention have (a) a polyether moiety with a minimum molecular weight of about 400 (e.g. from 400 to 200,000) and a maximum melting point of about 50° C., and (b) secondary amine terminal groups attached directly to the ends thereof. The essentially linear polyether moiety consists essentially of recurring groups of which at least a major portion consists of oxytetramethylene recurring units and at most a minor portion consists essentially of recurring units of a thioalkylene or another oxyalkylene having 2 to 6 straight chain carbon atoms (i.e. catenary carbon atoms), said polyether moiety having less than 6% by weight of tertiary amino nitrogen atoms. Both secondary amine terminal groups have the structure

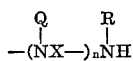

wherein R and Q are either (1) monovalent organic radicals free of hydrogen atoms bonded to nitrogen or sulfur or (2) together constitute a divalent organic radical completing a heterocyclic ring (preferably a 5 or 6 membered ring), $n$ is 0 or 1 and X is a divalent organic radical free of hydrogen atoms bonded to nitrogen or sulfur. Except as thus defined, the structure of R, Q and X is not otherwise limited. Illustrative of such secondary amine terminal groups are

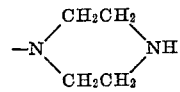

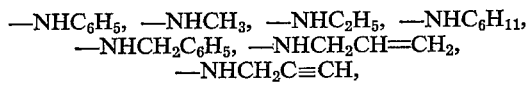

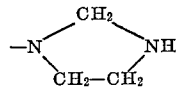

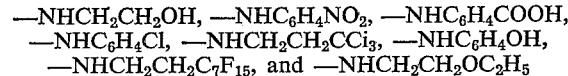

These polyether disecondary amines may be prepared by reacting tetrahydrofuran and up to about 40 mole percent of another cationically polymerizable cyclic ether or thioether in the presence of trifluoromethanesulfonic anhydride at temperatures of from about −40° C. to +80° C. in a polymerization system which is relatively free of (i.e., which contains at most only minor amounts of) monoalkylatable chain terminating agents, to produce a polyether polymer having a high degree of cationic activity at both ends of the polymer chain. Suitable cationically polymerizable cyclic ether comonomers having 2 to 6 ring carbon atoms include oxacycloheptane, 3,3-bis(chloromethyl oxacyclobutane, phenyl glycidyl ether, propylene oxide, propylene sulfide, epichlorohydrin, 2-methyl tetrahydrofuran, etc., all of which introduce from 2 to 6 carbon atoms into the polyether chain. The polymerization may be carried out in the presence of a solvent which is inert to alkylation reactions, such as methylene chloride and cyclohexane. The molecular weight of the dicationically active polyether varies in an inverse manner with the concentration of trifluoromethanesulfonic anhydride, and a 1/12 to 1/7000 molar ratio of trifluoromethanesulfonic anhydride to cyclic ether monomer is desired for the production of dicationically active polyethers having molecular weights from about 400 to about 250,000 at a conversion of 50%.

The dicationically active polyethers are strong alkylating agents and react with primary amines or disecondary amines to append terminal secondary amino radicals. In the course of this reaction tertiary amine groups may be introduced into the polyester chain as a result of chain extension. From stoichiometric to excess amounts of the primary and/or disecondary amine are preferred in the alkylation reaction, with the larger amounts giving lower levels of internal tertiary amine. A temperature from about −100° C. to about 60° C. is generally suitable, although the lower temperatures are generally preferable to moderate the rate of reaction. Examples of the simple disecondary amines include piperazine and carbon-substituted piperazines such as 2,5-dimethyl piperazine and 2-hydroxypiperazine. The primary amines have the formula $RNH_2$, wherein R is as defined above, and representative primary amines include $H_2NC_6H_5$, $H_2NCH_3$, $H_2NC_6H_{11}$, $H_2NCH_2C_6H_5$, $H_2NCH_2CH=CH_2$, $H_2NCH_2\equiv CH$ $H_2NCH_2CH_2OH$, $H_2NC_6H_4NO_2$, $H_2NC_6H_4COOH$,

$H_2NC_6H_4OH$, and $H_2NCH_2CH_2C_7F_{15}$. The polyether moiety (as measured in the form of the corresponding glycol) has a molecular weight of at least about 400 and a melting point below 50° C.

These polyether disecondary amines may be reacted with epoxy resins in a wide variety of formulations to yield elastomers having high tensile strength and elongation. The reaction between a secondary amine group and an oxirane group is one of chain extension; however, it may be desirable to modify the elastomer, for example in the direction of higher modulus, by introducing covalent crosslinks. This can be accomplished in several ways: (1) To the polyether disecondary amine may be added various amounts of additional amines having at least three amino hydrogen atoms (i.e. hydrogen atoms bonded to nitrogen) per molecule, such as diprimary amines or primary-secondary amines. These amines have two or more amine nitrogen atoms and are at least trifunctional in respect to the epoxy resin. Primary amine groups in such amine compounds are capable of reacting with two oxirane groups, yielding a crosslink. Examples of such diprimary amines include hexamethylenediamine, phenylenediamine, xylylenediamine and polyether diprimary amines such as polyoxypropylene diprimary amine and polyoxytetramethylene diprimary amine. Examples of primary-secondary amines are N-methylethylenediamine, diethylene-triamine, and a polyoxytetramethylene compound having a primary amine terminal group and a secondary amine terminal group. The increase in the extent of crosslinking, and hence the increase in the elastic modulus, will be proportional to the level of such additional amine used in the epoxy chain extension reaction with the polyether disecondary amines. (2) Epoxy resins with a higher oxirane equivalence than two, for example the triglycidyl derivative of p-aminophenol, may be employed. The reaction of more than two oxirane rings of a given epoxy resin molecule usually generates a crosslink, and the degree to which such reactions occur will be directly evidenced by the extent of increase in the elastic modulus of the final epoxy elastomer.

In the absence of significant level of crosslinking as introduced, for example, by the methods described above, the elastomer depends for the development of high strength and high elongation almost exclusively on the development of high molecular weight through the chain extension reaction. It has been found, moreover, that high strength in particular is favored by the incorporation of up to about 30 moles of a primary monoamine or, preferably, a simple (i.e. free of recurring ether units) disecondary aromatic or aliphatic amine, per mole of the polyether disecondary amine, in the chain extension reaction of the polyether polysecondary and the epoxy resin. The resulting segmented elastomer then contains "hard" segments of the epoxy reaction product with simple disecondary amine and/or primary monoamine, which are chain extended with the "soft" polyether segments. These "hard" segments make it more difficult for the chain extended elastomer molecules to slide by one another under tension, thus producing higher strength and elastic modulus while retaining high ultimate elongation.

In contrast to most conventional elastomers, which require a minimum covalent crosslink density, usually at least about 1 covalent crosslink per 50,000 molecular weight units, to provide adequate resistance to permanent set as a result of applied stress, the elastomers of this invention have good resilience and adequate recovery for many purposes even in the substantial absence of covalent crosslinks. It is usually preferred to have a crosslinking density of at least about 1 per 250,000 molecular weight units to provide a desirable balance between tensile, elongation and permanent set characteristics. Too high a crosslink density confers plastic, rather than elastomeric characteristics. In the particular elastomers of this invention, optimum crosslink density is influenced more by the average length of "soft" segments between crosslinks than by the total length of soft and hard segments between crosslinks. Usually there should be no more than about one covalent crosslink per 3,500 molecular weight units of soft segments, preferably no more than one per 5,000.

The relative amount of epoxy resin employed can be varied over wide limits, but sufficient epoxy resin must be present to accomplish the necessary chain extension. The amount of epoxy resin used should be at least stoichiometric with the total amine hydrogen, i.e. at least one oxirane ring per amino hydrogen atom. Excess epoxy resin over the stoichiometric requirement can thus be employed, and it may then be desirable to incorporate a catalyst for the homopolymerization of this excess epoxy resin, such as tris-2,4,6-dimethylaminomethylphenol. Inasmuch as the homopolymerization of the excess epoxy resin results in the formation of crosslinked product, this represents another method by which the physical properties of the final elastomer may be modified in the direction of higher elastic modulus.

The epoxy resin may contain some epoxy compounds with an oxirane equivalence of less than two, and it is possible in this way to reduce the degree of chain extension and crosslinking, if desired.

In order to obtain greater control of the rate of reaction, it may be desirable to employ a conventional amine-epoxy curing catalyst for the chain extension of the polyether disecondary amine with epoxy resin. Metal salts such as lithium bromide hydrate have been found useful in this regard.

In one method of preparing the chain extended polyether disecondary amine-epoxy elastomers of this invention, the polyether disecondary amine (and, optionally, a simple disecondary amine or other difunctional, oxirane reactive compound) is reacted with stoichiometric epoxy resin in a solvent such as tetrahydrofuran, in the presence of a suitable epoxy-amine curing catalyst, such as lithium bromide, hydrate, at a temperature between 0° and 100° C. The occurrence of chain extension reactions is indicated by an increase in the viscosity of the solution. Such solutions can then be coated on a surface to form, for example, a paint or an adhesive, and the solvent evaporated, optionally at elevated temperatures to yield the tough elastomer.

The elastomers of this invention are useful, for example, as coatings, adhesives, fibers, impregnants, cast rubber goods, binders, finishes, etc.

EXAMPLE 1

Preparation of 800 molecular weight polyether polysecondary amine 900 ml. of tetrahydrofuran (previously distilled from $LiAlH_4$ to remove water) and 246 ml. of cyclohexane were cooled to −60° C. in a two liter 3-neck flask equipped with stirrer, thermometer and drying tube. 100 ml. of $(CF_3SO_2)_2O$ was added slowly, the temperature being held below −50° C. until addition was complete. The reactants were then allowed to warm to −10° C. and held at this temperature for 21 minutes, during which period the viscosity of the reactants was observed to increase. Polymerization was then terminated by pouring the solution of dicationically active polyether into a cooled (to Dry Ice temperature), stirred solution of 600 ml. of $C_2H_5NH_2$ in 600 ml. of tetrahydrofuran. The resulting solution was allowed to warm to room temperature, excess $C_2H_5NH_2$ was vented, and the residues of the trifluoromethanesulfonic anhydride polymerization catalyst were removed by treatment with a strongly basic ion exchange resin ("IRA 402," a trademarked product of Rohm and Haas Company). After removal of solvent, 257 grams of a low melting, low viscosity polyether disecondary amine was obtained having an amine equivalent weight of 400, and hence, on a basis of two secondary amine nitrogens per polymer molecule, a molecular weight of 800.

EXAMPLE 2

Preparation of 5230 molecular weight polyether polysecondary amine 96 pounds of tetrahydrofuran was reacted with 4 pounds of $(CF_3SO_2)_2O$ in a stirred, glass lined reactor. Cooling water was employed to moderate the natural exotherm of the polymerization reaction to a peak temperature no higher than 50° C. After a reaction time of 22 minutes the viscous solution of dicationically active polymer was transferred into a solution of excess $CH_3NH_2$ in tetrahydrofuran. After purification of the product in the manner described in Example 1, 44 pounds of polyether disecondary amine was obtained having an amine equivalent weight of 2515, and hence, on a basis of two secondary amine nitrogens per polymer molecule, a molecular weight of 5230.

EXAMPLE 3

Preparation of 11,000 molecular weight polyether polysecondary amine 98 pounds of tetrahydrofuran was reacted with 2 pounds of $(CF_3SO_2)_2O$ in a stirred, glass lined reactor. Cooling water was employed to moderate the exotherm of the reaction to a peak temperature of about 50° C. After a reaction time of 33 minutes the resulting viscous solution of dicationically active polymer was transferred into a solution of excess $CH_3NH_2$ in tetrahydrofuran. After purification of the product in the manner described in Example 1, 41 pounds of polyether disecondary amine was obtained having an amine equivalent weight of 5500, and hence, on a basis of two secondary amine nitrogens per polymer molecule, a molecular weight of 11,000.

EXAMPLE 4

This example illustrates the conversion of the polyether disecondary amine of Example 1 to an elastomer by reaction with epoxy resin.

25 grams of the polyether diamine of Example 1, 3.57 grams of trans-2,5-dimethyl piperazine (1:1 mole ratio) and 24.0 grams of the diglycidyl ether of bisphenol A (oxirane equivalent weight=190) were dissolved in a mixture of about 15 ml. each of tetrahydrofuran and methanol and reacted for 4 days at room temperature in the presence of 0.3 gram of LiBr. The resulting solution, having increased in viscosity during the 4 day period, was poured into a rapidly rotating centrifugal film caster and allowed to dry at room temperature. The resulting tack-free film was post-cured 24 hours at 65° C. and then had the following properties:

Tensile at 100% elongation: 173 p.s.i.
Tensile at 300% elongation: 418 p.s.i.
Tensile at break: 1420 p.s.i.
Elongation at break: 450%
Permanent set at break: 0%
Hardness (Shore A): 62

EXAMPLE 5

This example illustrates the conversion of the polyether disecondary amine of Example 2 to an elastomer by reaction with epoxy resin.

40 grams of the polyether diamine of Example 2, 0.654 gram of piperazine (1:1 mole ratio) and 5.88 grams of the epoxy resin used in Example 4 were dissolved in a solvent mixture of about 20 ml. each of tetrahydrofuran and methanol and reacted for 2 days at room temperature in the presence of 0.5 gram of LiBr. The resulting viscous solution was poured into rapidly rotating centrifugal film caster at room temperature. After removal of the solvent the film was post-cured for 24 hours at 65° C. and then had the following properties:

Tensile at 100% elongation: 167 p.s.i.
Tensile at 300% elongation: 314 p.s.i.
Tensile at break: >3370 p.s.i. [1]
Elongation at break: >580% [1]

[1] Sample did not break at maximum extension of testing device.

EXAMPLE 6

This example illustrates the conversion of the polyether disecondary amine of Example 3 to elastomers by reaction with epoxy resins in a variety of formulations. Experimental procedures were similar to those described in Examples 4 and 5. Data and results are presented in Table I.

EXAMPLE 7

To illustrate the distinction between epoxy elastomers prepared from polyether diprimary amines of the type described earlier and epoxy elastomers prepared from the polyether disecondary amines of this invention comparative samples were prepared, the data appearing in Table II. In each sample the same epoxy resin, i.e. reaction product of diglycidyl ether and bisphenol A (equivalent weight of 190), was used in stoichiometric amount with the same total molar amount of amine. The polyether diprimary diamine and the polyether disecondary diamine had molecular weights of about 10,000 in each instance. All samples were prepared and cured using the same procedures and catalyst as set forth in Examples 4 and 5.

TABLE I

| A, grams diamine of Ex. III | B, grams simple diamine | A:B mole ratio | Grams epoxy resin | Tensile strength (p.s.i.) at— | | | Elongation at break, percent | Shore A hardness | Tear strength, p.s.i. |
|---|---|---|---|---|---|---|---|---|---|
| | | | | 100% elongation | 300% elongation | Break | | | |
| 40 | 0 | | [1] 1.4 | 205 | 281 | 1,240 | 650 | 64 | 119 |
| 40 | [2] .313 | 1:1 | [1] 2.8 | 134 | 179 | 2,315 | 740 | 51 | 89 |
| 40 | [2] 1.566 | 1:5 | [1] 8.38 | 229 | 648 | 5,980 | 700 | 55 | 179 |
| 40 | [2] 2.193 | 1:7 | [1] 11.17 | 223 | 948 | 6,000 | 660 | 54 | 187 |
| 40 | [2] 3.13 | 1:10 | [1] 15.36 | 383 | 2,048 | 5,290 | 500 | 67 | 227 |
| 40 | [3] .393 | 1:1 | [1] 4.15 | 255 | 651 | 2,900 | 440 | 50 | 112 |
| 40 | [3] .786 | 1:2 | [1] 6.98 | 184 | 430 | 3,720 | 510 | 53 | 225 |
| 40 | [4] .495 | 1:1 | [1] 4.19 | 218 | 566 | 4,050 | 480 | 56 | 113 |
| 40 | [5] .324 | | [1] 4.9 | 166 | 992 | 1,475 | 350 | 53 | 81 |
| 40 | [6] 1,256 | 1:3 | [7] 2.68 | 195 | | 4,180 | 540 | 56 | 129 |
| 35 | [6] 2.54 | 1:7 | {[7] 2.54, [1] 4.9} | 283 | | 4,470 | 460 | 61 | 157 |

[1] Diglycidyl ether of bisphenol A, oxirane eq. wt.=190.
[2] Piperazine.
[3] m-Phenylenediamine.
[4] m-Xylylenediamine.
[5] Diethylene triamine.
[6] Trans-2,5-dimethyl piperazine.
[7] A triepoxide derived from p-aminophenol.

TABLE II

| Sample | Polyether diprimary diamine | Polyether disecondary diamine | Amine | Epoxy resin, mols | Tensile strength (at break), p.s.i. | Elongation at break, percent |
|---|---|---|---|---|---|---|
| A | Polytetramethyleneoxy diprimary diamine (1 mol) | | Trans-2,5-dimethyl piperazine (3 mol) | 5 | 1,890 | 370 |
| B | | Polyoxytetramethylene disecondary diamine (1 mol) | do | 4 | 2,860 | 570 |
| C | Polytetramethyleneoxy diprimary diamine (1 mol) | | m-Xylylene diamine (1 mol) | 4 | 1,350 | 290 |
| D | | Polyoxytetramethylene disecondary diamine (1 mol) | do | 3 | 4,050 | 480 |

What is claimed is:
1. An elastomeric product obtained by the reaction of an epoxy resin, a major portion of which has an oxirane equivalence of about 2, and at least one amine having a minimum of 2 amino hydrogen atoms per molecule, at least about 3 mole percent of said amine and a major portion of all polyether polyamine being a polyether disecondary amine having
 (a) a polyether moiety of 400 minimum molecular weight and 50° C. maximum melting point, said moiety consisting essentially of recurring units of which at least a major portion consists of oxytetramethylene recurring units and at most a minor portion consists essentially of another oxyakylene or thioalkylene recurring units having from 2 to 6 straight chain carbon atoms, said polyether moiety having less than 6 weight percent of tertiary amino nitrogen atoms, and
 (b) secondary amine terminal groups attached directly to each end of said polyether moiety,
the amount of said epoxy resin being sufficient to provide at least one oxirane ring for each amino hydrogen atom, said reaction being conducted in the presence of an epoxy amine curing catalyst.

2. The elastomeric product of claim 1 in which said secondary amine terminal groups have the structure

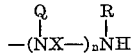

wherein R and Q are either (1) monovalent organic radicals free of hydrogen atoms bonded to nitrogen or sulfur or (2) together constitute a divalent organic radical completing a heterocyclic ring, $n$ is 0 or 1, and X is a divalent organic radical free of hydrogen atoms bonded to nitrogen or sulfur.

3. The elastomeric product of claim 1 in which said amine having at least two hydrogen atoms per molecule includes a disecondary amine free of recurring ether units.

4. The elastomeric product of claim 1 in which said amine having at least two hydrogen atoms per molecule consists of said polyether disecondary amine and a disecondary amine free of recurring ether units.

5. The elastomeric product of claim 4 in which all of said epoxy resin has an oxirane equivalence of about 2, the product being an essentially uncrosslinked elastomer.

6. The elastomeric product of claim 1 in which said amine having at least two amino hydrogen atoms per molecule includes an amine having at least three hydrogen atoms per molecule and said product is a crosslinked elastomer.

7. The elastomeric product of claim 1 in which a portion of said epoxy resin is an epoxy resin with an oxirane equivalence greater than 2 and said product is a crosslinked elastomer.

8. The elastomeric product of claim 1 in which the ratio of said epoxy resin to said polyether polyamine is sufficient to provide more than one oxirane ring for each amino hydrogen atom and said product is a crosslinked elastomer.

References Cited
UNITED STATES PATENTS
3,380,881    4/1968    Williamson.
3,436,359    4/1969    Hubin.
2,642,412    6/1953    Newey et al.
FOREIGN PATENTS
868,733    5/1961    Great Britain.

WILLIAM H. SHORT, Primary Examiner
T. E. PERTILLA, Assistant Examiner

U.S. Cl. X.R.
117—161; 260—830

UNITED STATES PATENT OFFICE
CERTIFICATE OF CORRECTION

Patent No. 3,580,887      Dated May 25, 1971

Inventor(s) Allen J. Hubin

It is certified that error appears in the above-identified patent and that said Letters Patent are hereby corrected as shown below:

Column 4 line 61, "$H_2NCH_2{\equiv}CH$" should be --$H_2NCH_2C{\equiv}CH$--

Column 7 line 4, "2515" should be --2615--

TABLE I, 10th item from top, column 2, "1.256" should be --1.25--

Signed and sealed this 26th day of October 1971.

(SEAL)
Attest:

EDWARD M. FLETCHER, JR.       ROBERT GOTTSCHALK
Attesting Officer      Acting Commissioner of Patents